United States Patent
Rouquette

(10) Patent No.: US 7,167,413 B1
(45) Date of Patent: Jan. 23, 2007

(54) TOWED STREAMER DEGHOSTING

(75) Inventor: Robert E. Rouquette, Kenner, LA (US)

(73) Assignee: Input/Output, Stafford, TX (US)

( * ) Notice: Subject to any disclaimer, the term of this patent is extended or adjusted under 35 U.S.C. 154(b) by 0 days.

(21) Appl. No.: 11/380,972

(22) Filed: May 1, 2006

(51) Int. Cl.
*G01V 1/00* (2006.01)
*G01V 1/38* (2006.01)

(52) U.S. Cl. .................... 367/20; 181/110; 181/112
(58) Field of Classification Search ........... 367/20; 181/110, 112
See application file for complete search history.

(56) References Cited

U.S. PATENT DOCUMENTS

| | | | |
|---|---|---|---|
| 3,299,397 A | 1/1967 | Pavey, Jr. et al. | |
| 4,437,175 A | 3/1984 | Berni | |
| 4,477,887 A | 10/1984 | Berni | |
| 4,486,865 A | 12/1984 | Ruehle | |
| 4,520,467 A | 5/1985 | Berni | |
| 4,935,903 A | 6/1990 | Sanders et al. | |
| 4,979,150 A | 12/1990 | Barr | |
| 5,251,181 A * | 10/1993 | Toda ................... | 365/230.08 |
| 5,621,700 A | 4/1997 | Moldoveanu | |
| 6,512,980 B1 | 1/2003 | Barr | |
| 2004/0042341 A1 | 3/2004 | Tenghamn et al. | |

FOREIGN PATENT DOCUMENTS

GB 2395273 A * 5/2004

* cited by examiner

*Primary Examiner*—Mark Hellner
(74) *Attorney, Agent, or Firm*—James T. Cronvich

(57) ABSTRACT

Apparatus and methods for reducing ghosts from hydrophone signals in a streamer towed underwater close to the sea surface. A multi-axis micro-electro-mechanical-system (MEMS) accelerometer with attitude sensing is used to reduce the frequency spectral notch in the response of the combined hydrophone-accelerometer system and to reduce the sensitivity to ghost-producing downward traveling acoustic waves that are sea-surface reflections of the primary upward traveling acoustic waves. Multi-axis spring load cells provide high compliance and mechanical isolation between stress members and the accelerometer system. The load cells also provide signals representing the vibration of the stress members. The signals can be used with an adaptive filter estimating the mechanical transfer function between the vibration and the motion of the accelerometer system to remove the vibration-induced noise from the accelerometer signals.

20 Claims, 5 Drawing Sheets

TOWED STREAMER DEGHOSTING

BACKGROUND

The invention relates generally to marine seismic prospecting and, more particularly to apparatus and methods for reducing the effects of spurious seismic reflections in hydrophones arrayed in a streamer towed behind a survey vessel.

In marine seismic exploration, a hydrophone array is towed behind a marine vessel near the sea surface. The hydrophones are in multiple linear hoses known as steamers. A seismic source, also towed near the sea surface, periodically emits acoustic energy. This acoustic energy, which is in the seismic frequency band, travels downward through the sea, reflects off underlying rock structures, and returns upward through the sea to the hydrophone array. Ideally the hydrophone array records the upward traveling seismic acoustic wave from the seabed. The hydrophone recordings are later processed into seismic images of the underlying rock structures.

Because a hydrophone has an omni-directional response, the hydrophone array also records a ghost response, which is the desired seismic acoustic wave reflected from the sea surface and arriving delayed in time and reversed in polarity. The ghost is a downward traveling seismic acoustic wave that, when added to the desired wave, blurs the recorded seismic image. A similar visual effect occurs with broadcast television using an old-fashioned "rabbit ear" antenna.

The ghost produces a notch in the frequency spectrum of a hydrophone record at $f_{notch}=c/2d$, where c is the speed of sound and d is the streamer depth. Seismic streamers have been conventionally towed at a depth of 10 meters. At d=10 m, $f_{notch}=75$ Hz. A frequency response extending beyond 100 Hz is required for high seismic image resolution. At d=4 m, $f_{notch}=188$ Hz. Streamers are therefore towed at a depth of 4 meters to improve the resolution of a seismic image. But towing at 4 meters increases downtime due to adverse weather and accompanying high sea states. Furthermore, seismic image quality would actually improve at greater towing depths because there is less acoustic background noise at greater depths and because the auxiliary equipment used to measure and control the hydrophone positions works better at greater depths for a given sea state.

Thus, there is a need for towing a streamer at any practical depth with high seismic image resolution to increase the productivity of seismic surveying.

Ocean-bottom systems, in which the seismic streamer is laid on the seabed, reject ghosts by a technique known as p-z summation. In an acoustic wave, the pressure p is a scalar and the particle velocity u is a vector. A hydrophone records the seismic acoustic wave pressure p, with a +omni-directional response. A vertically oriented geophone, often implemented with an accelerometer, records the vertical component of the seismic acoustic wave particle velocity $u_z$, with a figure-of-8 response, +lobe pointing down and –lobe pointing up, as illustrated in the beam patterns of FIG. 10. In p-z summation the velocity signal is scaled by the acoustic impedance pc of seawater and added to the pressure signal. This produces a compound sensor that has full response to the upward traveling wave and zero response to the downward traveling wave to reject the ghost.

Ocean-bottom streamers experience any roll angle from 0° to 360° and moderate pitch angles. To implement a vertically oriented geophone, ocean-bottom systems have used: (a) a gimbaled moving-coil geophone; (b) a 3-component, omni-tilt moving-coil geophone with attitude sensing and synthetic $u_z$ computation external to the sensor; and (c) a 3-component, micro-electro-mechanical system (MEMS) accelerometer geophone with internal attitude sensing and synthetic uZ computation external to the sensor. But all these solutions have shortcomings, such as large size, mechanical reliability, and reliance on external computation.

SUMMARY

These shortcomings are overcome and these needs are satisfied by an underwater cable embodying features of the invention. In one aspect of the invention, an underwater cable comprises a stress member extending axially through the cable and an accelerometer system mounted within the cable. The accelerometer system produces output signals indicative of motion of the cable in response to acoustic signals and environmental conditions. A load cell system, connected between the stress member and the accelerometer system, is sensitive to mechanical vibrations in the stress member. The load cell system provides output signals indicative of the mechanical vibrations and has a mechanical compliance tending to isolate the accelerometer from the mechanical vibrations in the stress member.

In another aspect of the invention, a streamer apparatus comprises a streamer, a stress member extending along the streamer, a hydrophone system sensitive to acoustic pressure and providing pressure signals, and a deghosting and noise reduction system. The deghosting and noise reduction system includes an accelerometer system, a load cell system, and a signal processor. The accelerometer system senses the motion of the accelerometer system and provides accelerometer signals. The load cell system, which has mechanically compliant portions between first ends rigidly connected to the stress member and second ends rigidly connected to the accelerometer system, is sensitive to the vibration of the stress member and provides vibration signals. The signal processor receives the pressure signals from the hydrophone system, the accelerometer signals from the accelerometer system, and the vibration signals from the load cell system to reduce the effect of vibration noise and surface-reflected acoustic signal interference on a primary acoustic signal impinging on the streamer.

In yet another aspect of the invention, a streamer apparatus comprises a stress member extending along the length of the streamer in a longitudinal direction. A rigid mounting body, retained in the streamer, has first and second mutually orthogonal mounting surfaces parallel to the longitudinal direction. A multi-axis accelerometer is connected rigidly to the mounting surfaces of the rigid mounting body. A rigid block is rigidly connected directly to the stress member between the stress member and the rigid mounting body. The block includes first and second mutually orthogonal outer surfaces parallel to the longitudinal direction. First and second load cells each have first and second ends separated by a mechanically compliant portion. The first end of the first load cell is rigidly connected to the first outer surface of the rigid block, and the first end of the second load cell is rigidly connected to the second outer surface of the rigid block. The second end of the first load cell is rigidly connected to the first mounting surface of the rigid mounting body, and the second end of the second load cell is rigidly connected to the second mounting surface of the rigid mounting body.

In another aspect of the invention, a method for extracting a primary acoustic signal traveling upward from the seabed and impinging on an underwater cable having a stress member extending axially therealong from an acoustic signal traveling downward from the sea surface and impinging on an underwater cable and from vibration of the stress member, comprises: (a) deploying a hydrophone on the cable providing a first signal indicative of acoustic pressure; (b) deploying an accelerometer system on the cable providing output signals indicative of acoustic velocity and cable vibration induced by the motion of the cable in the water; (c) deploying a load cell system interposing a mechanical compliance between the accelerometer system and the stress member and providing output signals indicative of the vibration of the stress member relative to the accelerometer system; (d) providing a second signal, indicative of the motion of the cable, from the output signals of the accelerometer; (e) providing a third signal, indicative of the vibration of the cable due to the vibration of the stress member, from the output signals of the load cell system; and (f) combining the first, second, and third signals to provide a signal representing the primary acoustic signal.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
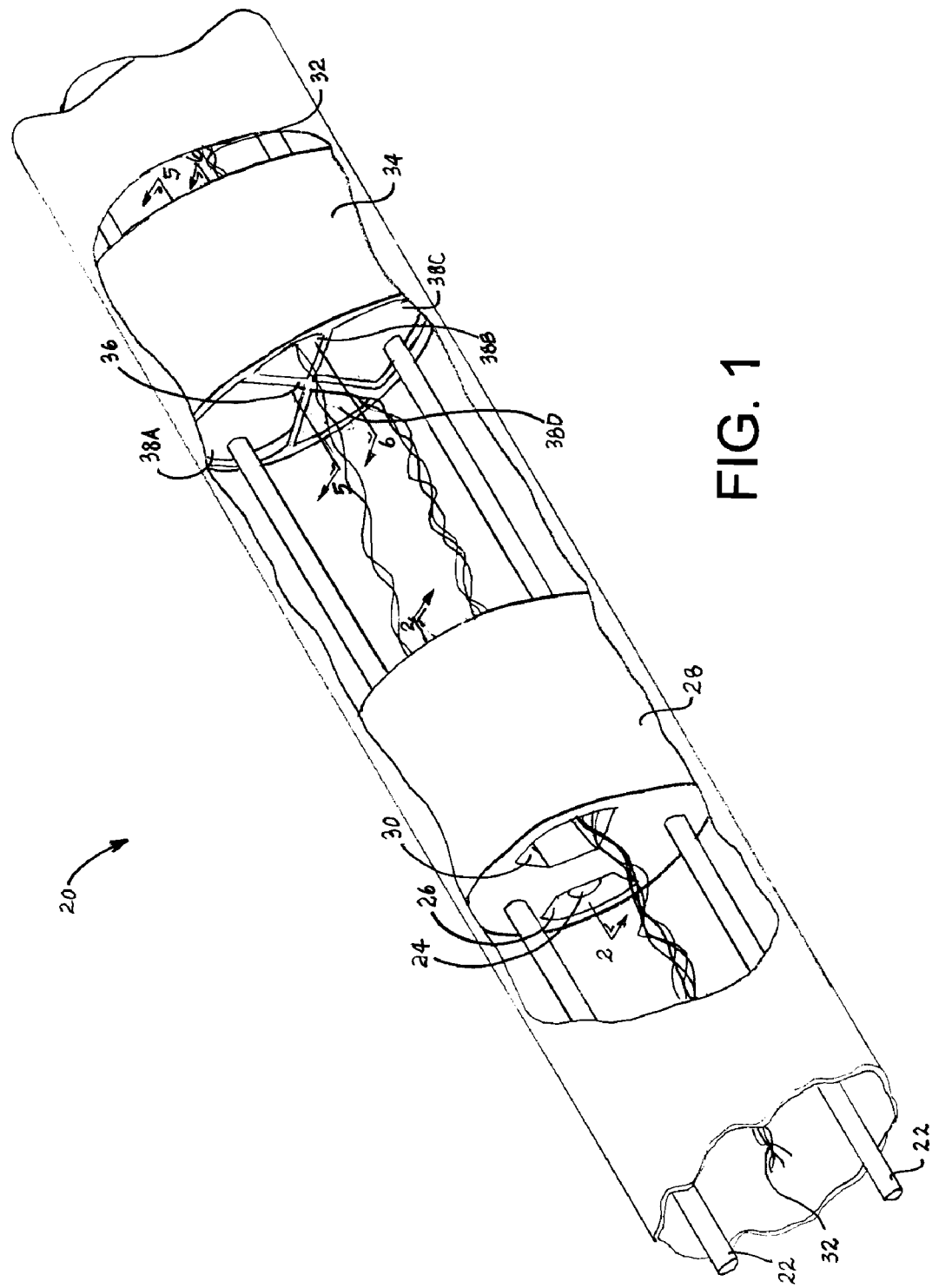
FIG. 1 is an isometric view, partly cut away, of a portion of a streamer embodying features of the invention.

A portion of a streamer embodying features of the invention is shown cut away in FIG. 1. The streamer 20 includes one or more stress members 22—two, in this example—running the length of the streamer. The stress members are conventional KEVLAR® cables that bear the towing tension. The streamer also includes an array of hydrophones 24, typically spaced at 3.125-meter intervals along the length of the streamer. (One hydrophone section is shown in FIG. 1.) The hydrophone is mounted in a chamber 26 of a hydrophone housing 28. The hydrophone housing is made of a material whose acoustic properties are compatible with those of seawater. The streamer stress members extend through the hydrophone housing, which further includes a passageway 30 for power and signal lines 32 that route power from a survey vessel to streamer instrumentation and electronic signals to and from the hydrophones and other instrumentation along the streamer. Located within about a half meter of the hydrophone is an accelerometer housing 34. The accelerometer housing shown in this example is a rigid cylindrical body, metal or plastic, with a cruciform divider 36 defining four chambers 38A–38D within the housing. The stress members extend through two of the chambers 38A and 38C. An accelerometer system resides in the third chamber 38B. The fourth chamber 38D provides a passageway for the streamer wire bundle 32. The streamer is conventionally filled with a fluid, such as kerosene, or a solid polymer to make the streamer neutrally buoyant.

Figure 2:
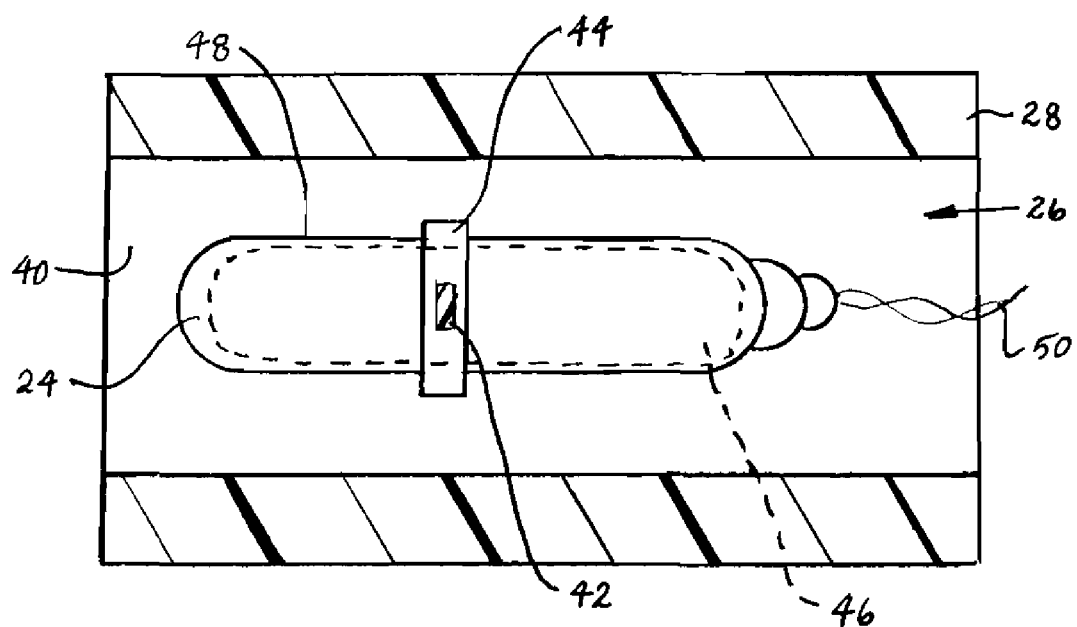
FIG. 2 is a cross section of a hydrophone housing in the streamer of FIG. 1 taken along lines 2—2.
Figure 3:
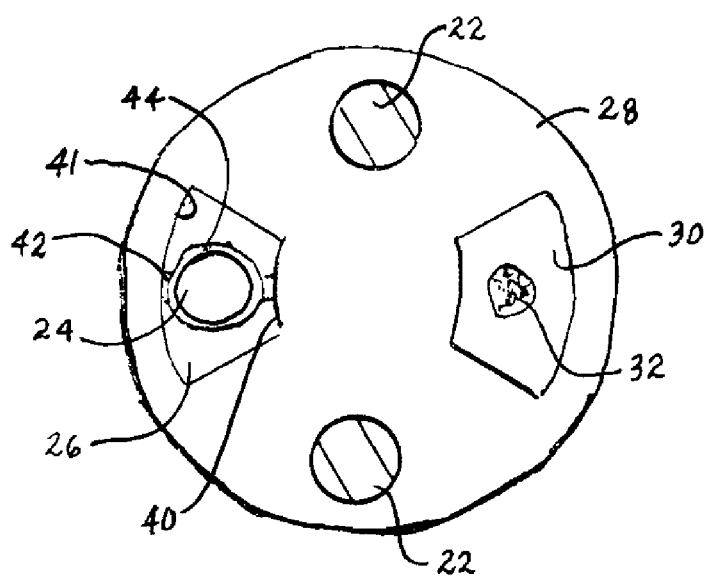
FIG. 3 is an end-on view of the hydrophone housing of FIG. 2.

As shown in FIGS. 2 and 3, the hydrophone 24 is attached to opposite walls 40, 41 of the chamber 26 by tabs 42 extending outward of a ring 44 encircling the hydrophone. Receptacles (not shown) in the walls receive the tabs to mount the hydrophone in the chamber. A conventional hydrophone includes a pressure-sensitive piezo-ceramic element 46 encapsulated in a protective outer shell 48 having the acoustic characteristics of sea water. Signal wires 50 carrying hydrophone signals lead from the hydrophones to signal processing electronics in the nearby accelerometer housing.

Figure 4:
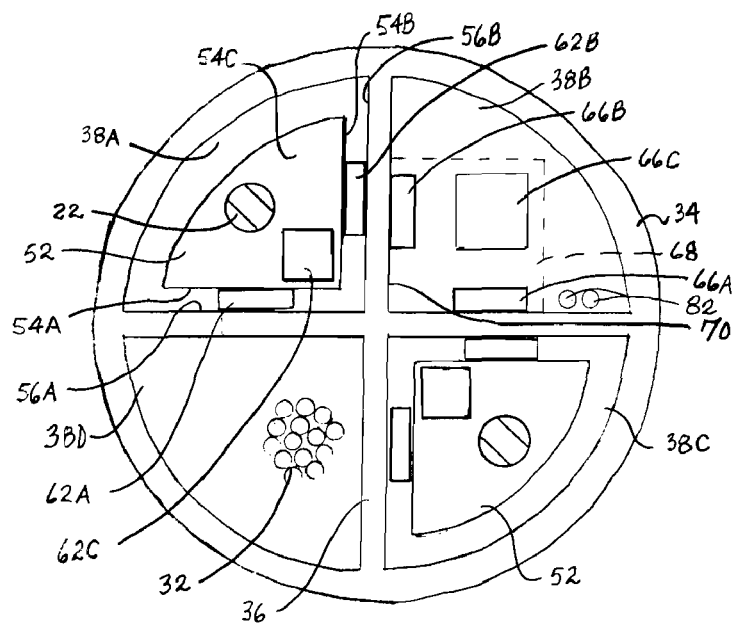
FIG. 4 is an end-on view of an accelerometer housing in the streamer of FIG. 1 with end-plates removed.
Figure 5:
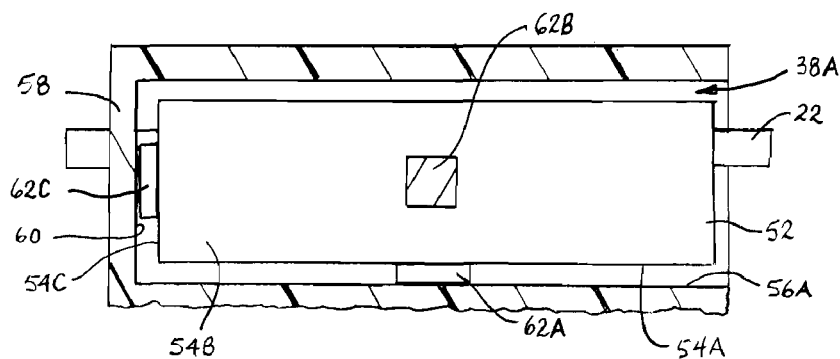
FIG. 5 is a cross section of a portion of the stress-member chamber of the accelerometer housing of FIG. 4 taken along lines 5—5 of FIG. 1.
Figure 6:
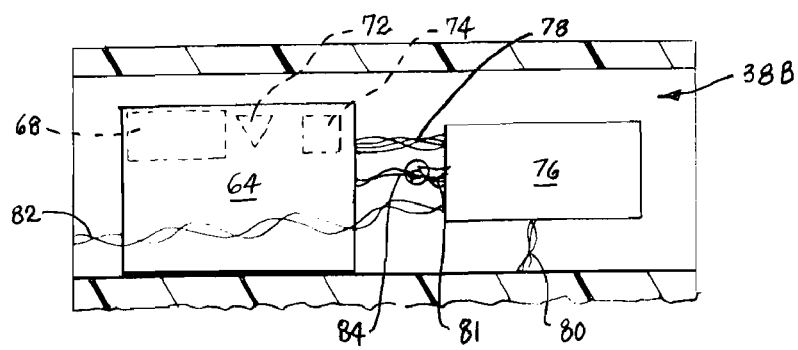
FIG. 6 is a cross section of a portion of the accelerometer chamber of the accelerometer housing of FIG. 4 taken along lines 6—6 of FIG. 1.

FIGS. 4–6 show the accelerometer housing and its constituents. The rigid housing 34 with its cruciform structure 36 divides the interior of the housing into the four sector-shaped chambers 38A–38D. The stress members 22 extend through rigid blocks 52 that extend along the length of the accelerometer housing in opposite chambers 38A and 38C. Each stress member runs through and is stationary relative to one of the blocks. The blocks have three orthogonal faces 54A, 56B, and 54C. The cruciform structure 36 of the rigid housing forms two surfaces 56A and 56B opposing the lateral faces 54A and 54B on the block. An end plate 58 on the housing at one end of each of the stress-member chambers 38A and 38C forms a third rigid surface 60 that opposes the end face 54C of the block. Each stress member and its surrounding block is suspended in its chamber by a load cell system comprising three orthogonally disposed springs 62A–62C, each connecting a face 54A–54C of the block to an opposed rigid surface 56A, 56B, 60 of the housing. The spring connection isolates the housing and the accelerometer mounted in another chamber from vibrations in the stress members. Although the springs provide a high mechanical compliance between the blocks and the housing and good isolation, the amplitude of vibrations can still be high enough to interfere with the accelerometer system. For that reason, the springs, 62A–62C are designed as load cells to measure the vibration of the stress members. The load cells 62A and 62B attached to the lateral faces of the blocks sense the radial vibration of the stress members. The load cell 62C attached to the end face of the block measures the in-line component of vibration. Thus, the load cell system supports the stress members in the chambers, mechanically isolates the stress members from the accelerometer system, and measures the vibration of the stress members.

An accelerometer system 64, performing as a geophone, is mounted in the accelerometer housing 34 in the accelerometer chamber 38B. The accelerometer is preferably a multi-component MEMS device. Colibrys, Inc. of Stafford, Tex., U.S.A., for example, sells MEMS accelerometers. A three-axis accelerometer is shown in this example. The three accelerometers 66A–66C are orthogonally disposed in a package 68 having at least one reference surface attached directly to a surface 70 of the housing. The housing surfaces 56A, 56B, 60, 70 to which the accelerometer's reference surface is attached and to which the load cells are attached are oriented in a known relationship. In this example, all the surfaces are either parallel or perpendicular to each other. The accelerometer system, which determines the velocity of an acoustic wave impinging on it, is also sensitive to surface-reflected waves and other environmental conditions, such as streamer vibrations. The accelerometer system also includes an attitude sensor 72 that determines the direction of the earth's gravity vector. A signal processor 74 in the accelerometer uses the accelerometer and attitude signals to determine the velocity of an acoustic wave. Acoustic wave velocity signals are routed from the accelerometer system to a local signal processor and communications controller (SPC) 76 over accelerometer signal wires 78. The SPC also receives signals from the load cell system over load cell signal wires 80, 81 from each chamber. And the SPC receives the hydrophone signals over hydrophone signal wires 82. Power, control, and signal wires 84 from the streamer wire bundle 32 connect to the accelerometer system 64 and the SPC 76. Besides processing the acoustic wave, the SPC also receives data and commands from the vessel's computer system and returns data and status.

Figure 7:
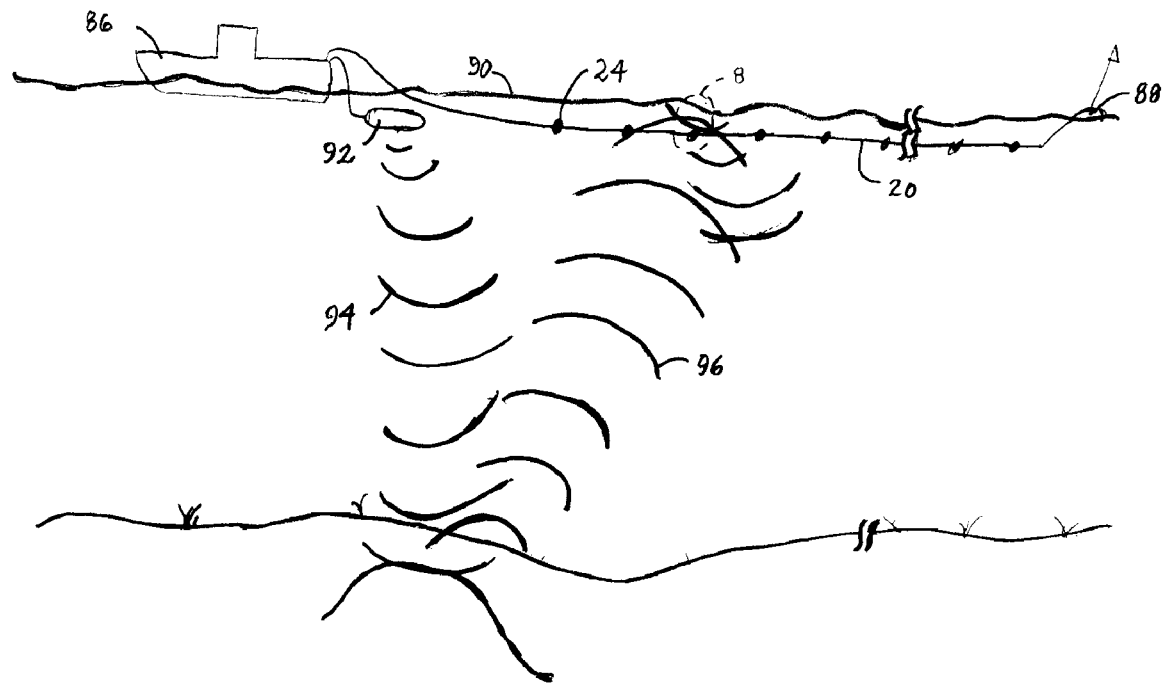
FIG. 7 is a pictorial representation of a streamer as in FIG. 1 towed behind a survey vessel.
Figure 8:
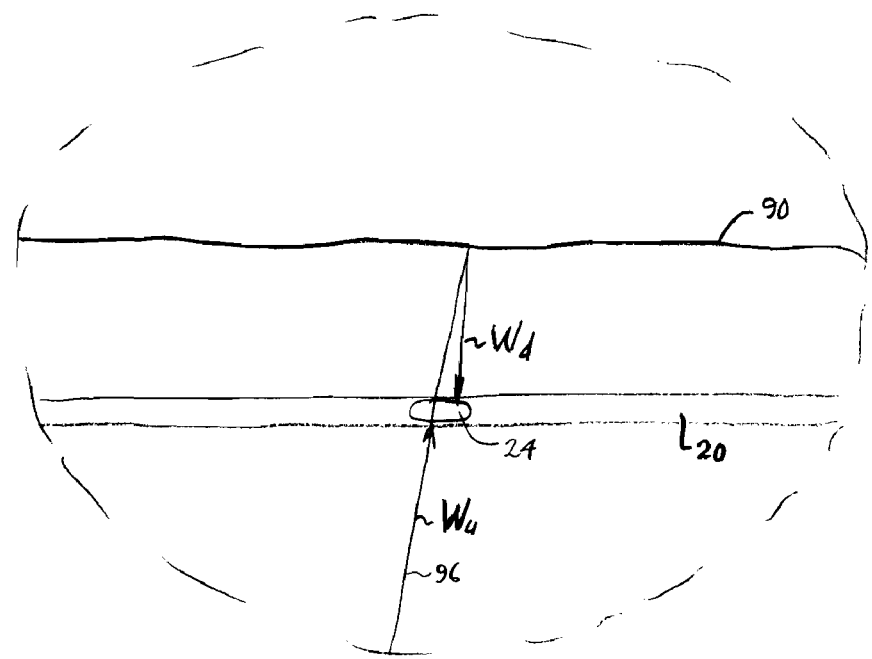
FIG. 8 is an enlarged view of a single hydrophone of the streamer of FIG. 7 illustrating the upward seismic wave and the downward, surface-reflected ghost seismic wave impinging on the hydrophone.

The deployment of the streamer 20 is illustrated in FIG. 7. The streamer is an underwater cable towed behind a survey vessel 86, typically along with other parallel streamers. A streamer may be as long as 12 km. Hydrophones 24 are spaced about every 3.125 m along its length. Located within about 0.5 m of each hydrophone is an accelerometer/load cell system as in FIG. 1. The streamer, which terminates in a tail buoy 88, is maintained at a fixed depth, such as 4 m to 10 m below the sea surface 90, or even deeper. The survey vessel also tows a seismic energy source 92 that periodically emits a burst of seismic energy 9, which propagates into geologic structures beneath the sea floor and reflects off them as an upward traveling acoustic wave 96 that impinges on the hydrophones. The upward traveling wave $W_u$ (96), as shown in FIG. 8, continues past the hydrophone and reflects at the sea-air interface to form a downward traveling acoustic wave $W_d$. The downward traveling wave interferes with the upward traveling wave, which is the primary seismic signal of interest. Unless the interference is attenuated sufficiently, ghosts appear in the seismic data.

Figure 9:
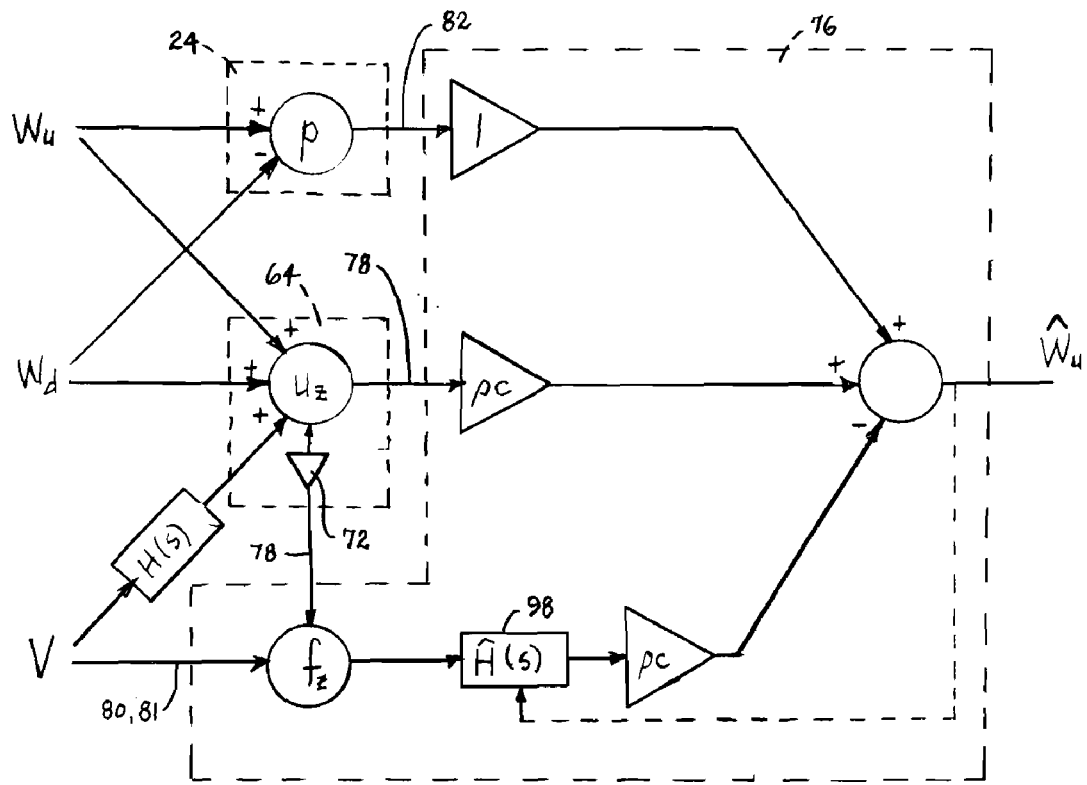
FIG. 9 is a block diagram of the deghosting logic used to extract the upward seismic wave from the ghost and vibration noise.
Figure 10:
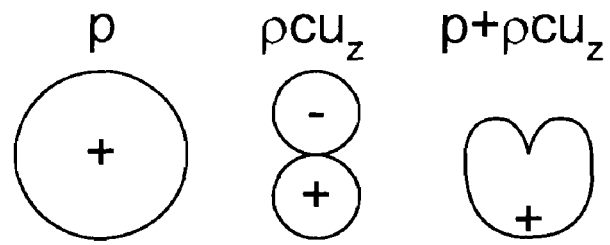
FIG. 10 illustrates conventional acoustic beam patterns for a hydrophone, an accelerometer, and their combination to reduce ghost interference.

A block diagram of the signal processing logic used to suppress ghosts is shown in FIG. 9. The block diagram represents processing that occurs locally in the accelerometer system 64 and the local SPC 76. The hydrophone 24, which senses acoustic pressure, develops a pressure signal proportional to the sum of the upward traveling seismic wave $W_u$ and the surface-reflected and phase-reversed downward traveling wave $W_d$. The pressure signal is sent to the SPC 76 over hydrophone signal wires 82. The accelerometer system 64 senses the particle acceleration and derives the net particle velocity resulting from the upward- and downward traveling acoustic waves $W_u$ and $W_d$. The particle velocity u determined by the accelerometer system also includes a noise component due to the vibration V of the stress members. A preferred version of the accelerometer system also includes the attitude sensor 72, which allows the accelerometer processor to resolve the vertical component $u_z$ of particle velocity, which is sent to the SPC over accelerometer signal lines 78. Signals representing the attitude of the entire accelerometer system are also sent to the SPC over the accelerometer signal lines. The SPC scales the pressure signal from the hydrophone and the vertical velocity signal $u_z$ from the accelerometer. The velocity signal is multiplied by the acoustic impedance pc of sea water to convert the velocity into a pressure value, where p is the density and c is the speed of sound. The combination of the scalar pressure signal p from the hydrophones and the scaled vertical particle velocity signal $pcu_z$ from the accelerometer system yields the effective beam pattern $p+pcu_z$ shown in FIG. 10 which attenuates the downward traveling wave $W_d$ and allows the streamer to be deployed at greater depths.

But the accelerometer reading is also affected by noise in the seismic frequency band caused by the vibration of the stress members. The vibration V affects the accelerometer output according to the transfer function H(s) between the vibration of the stress members and the velocities it induces in the accelerometer. To attenuate the vibration noise, the vibration V measured by the load cells is sent to the SPC over the load cell signal lines 80, 81. From the load cell signals and the attitude sensor's signals, a synthetic vertical component of force $f_z$ is derived. An adaptive signal processor 98, such as a least-mean-square adaptive filter, is used to estimate the actual mechanical transfer function H(s) with enough accuracy to reduce the vibration-induced noise to the self-noise floor of the accelerometer. The estimated transfer function H(s), which is seeded with a nominal H value at start-up to improve the convergence of the filter, uses the signal processor's output estimate $\hat{W}_u$ of the primary upward traveling acoustic wave to update the adaptive filter. The noise velocity component out of the adaptive filter is scaled by the acoustic impedance pe to produce a pressure signal that is subtracted from the accelerometer and hydrophone signals to produce the noise-free estimated upward traveling wave $\hat{W}_u$.

Because a surface-towed streamer typically pitches less than ±6°, the in-line load cell 62C and the in-line accelerometer 66C shown in FIG. 4 may be eliminated. With two-axis load cells and a two-axis accelerometer, the system has a minimum of 40 dB of ghost rejection for streamer pitches of less than the typical range of about ±6°.

Thus, by attenuating the surface-reflected downward traveling wave and the vibration noise, the deghosting and noise-reduction system allows streamers to be operated at greater depths unaffected by rough sea conditions at the surface.

Although the invention has been described in detail with respect to a preferred version, other versions are possible. For example, the accelerometer housing could include more chambers or chambers of different shapes and could be designed to accommodate a single stress member or more than two stress members. As another example, some of the processing shown performed by the SPC could be performed in the accelerometer's signal processor 74. Furthermore, the processors could resolve the vertical components first and then scale and combine them or could first scale and combine the vector quantities and then resolve the vertical components. As yet another example, the attitude sensor need not be integrated into the accelerometer system. The accelerometers may be analog accelerometer systems that send analog signals to the SPC, or the highly-integrated digital system as described that includes a signal processor sending digital data to the SPC. So, as these few examples suggest, the scope of the claims is not meant to be limited to the preferred version described in detail.

What is claimed is:

1. An underwater cable comprising:
   a stress member extending axially through the cable;
   an accelerometer system mounted within the cable and producing output signals indicative of motion of the cable in response to acoustic signals and environmental conditions;

a load cell system connected between the stress member and the accelerometer system and sensitive to mechanical vibrations in the stress member to provide output signals indicative of the mechanical vibrations, the load cell system having a mechanical compliance tending to isolate the accelerometer from the mechanical vibrations in the stress member.

2. A cable as in claim 1 further comprising a rigid mounting body positioned in the cable and wherein the accelerometer is rigidly mounted to the rigid mounting body and wherein the load cell system has first and second ends with the second ends rigidly connected to the rigid mounting body and the first ends rigidly connected to the stress member.

3. A cable as in claim 2 further comprising a rigid block interposed between the first ends of the load cell system and the stress member to connect the load cell system rigidly to the stress member.

4. A cable as in claim 1 wherein the accelerometer system includes first and second accelerometers oriented to sense orthogonal components of the radial motion of the cable.

5. A cable system as in claim 4 wherein the accelerometer system further includes a third accelerometer oriented to sense axial motion of the cable.

6. A cable as in claim 1 wherein the load cell system includes first and second orthogonally disposed load cells connected between the stress member and the accelerometer to sense radial mechanical vibrations in the stress member along orthogonal radial axes.

7. A cable as in claim 6 wherein the load cell system further includes a third load cell disposed orthogonal to the first and second load cells to sense axial mechanical vibrations in the stress member.

8. A cable as in claim 1 further comprising at least one additional stress member extending axially through the cable and a corresponding additional load cell system connected to each additional stress member.

9. A cable as in claim 3 further comprising at least one additional stress member affixed to at least one additional rigid block.

10. A cable as in claim 1 wherein the accelerometer system further includes an attitude sensor.

11. A cable as in claim 1 wherein the accelerometer system comprises a multi-axis analog micro-electromechanical accelerometer.

12. A cable as in claim 1 wherein the accelerometer system comprises a multi-axis digital micro-electromechanical accelerometer.

13. A cable as in claim 1 wherein the accelerometer system further includes an attitude sensor providing output signals indicative of the vertical gravitational vector and wherein the cable further comprises a signal processor processing the output signals from the load cell system and the output signals from the attitude sensor to resolve the vertical component of the vibration force of the stress member on the accelerometer system.

14. A cable as in claim 13 wherein the signal processor further converts the vertical component of the vibration force into a vibration-induced vertical velocity of the accelerometer system by means of a mechanical transfer function between the vertical component of the vibration force and the vertical velocity of the accelerometer system.

15. A cable as in claim 13 further comprising:
a plurality of hydrophones disposed along the axis of the cable at axially spaced locations within the cable and providing output signals indicative of the acoustic pressure due to acoustic signals and environmental conditions;
wherein the signal processor produces an output signal representing the primary acoustic signal from the output signals of the load cell system, the attitude sensor, the accelerometer system, and the hydrophones.

16. A streamer apparatus comprising:
a streamer;
a stress member extending along the streamer;
a hydrophone system sensitive to acoustic pressure and providing pressure signals;
an accelerometer system sensitive to the motion of the accelerometer system providing accelerometer signals;
a load cell system having mechanically compliant portions between first ends rigidly connected to the stress member and second ends rigidly connected to the accelerometer system and sensitive to the vibration of the stress member and providing vibration signals;
a signal processor receiving the pressure signals from the hydrophone system, the accelerometer signals from the accelerometer system, and the vibration signals from the load cell system to reduce the effect of vibration noise and surface-reflected acoustic signal interference on a primary acoustic signal impinging on the streamer.

17. A streamer apparatus comprising:
a stress member extending along the length of the streamer in a longitudinal direction;
a rigid mounting body retained in the streamer and having first and second mutually orthogonal mounting surfaces parallel to the longitudinal direction;
a multi-axis accelerometer connected rigidly to the mounting surfaces of the rigid mounting body;
a rigid block rigidly connected directly to the stress member between the stress member and the rigid mounting body, the block including first and second mutually orthogonal outer surfaces parallel to the longitudinal direction;
first and second load cells each having first and second ends separated by a mechanically compliant portion,
wherein the first end of the first load cell is rigidly connected to the first outer surface of the rigid block and the first end of the second load cell is rigidly connected to the second outer surface of the rigid block, and
wherein the second end of the first load cell is rigidly connected to the first mounting surface of the rigid mounting body and the second end of the second load cell is rigidly connected to the second mounting surface of the rigid mounting body.

18. A method for extracting a primary acoustic signal traveling upward from the seabed and impinging on an underwater cable having a stress member extending axially therealong from an acoustic signal traveling downward from the sea surface and impinging on an underwater cable and from vibration of the stress member, the method comprising:
deploying a hydrophone on the cable providing a first signal indicative of acoustic pressure;
deploying an accelerometer system on the cable providing output signals indicative of acoustic velocity and cable vibration induced by the motion of the cable in the water;
deploying a load cell system interposing a mechanical compliance between the accelerometer system and the stress member and providing output signals indicative of the vibration of the stress member relative to the accelerometer system;

providing a second signal, indicative of the motion of the cable, from the output signals of the accelerometer;

providing a third signal, indicative of the vibration of the stress member, from the output signals of the load cell system;

combining the first, second, and third signals to provide a signal representing the primary acoustic signal.

19. The method of claim 18 further comprising:

providing an attitude signal in relation to earth's gravity used in deriving the vertical components of the motion of the cable and of the vibration of the stress member as the second and third signals.

20. A deghosting and noise reduction system for a hydrophone producing pressure signals representing acoustic pressure and mounted in a streamer having one or more stress members extending axially along the streamer, the system comprising:

an accelerometer system mounted in a streamer proximate a hydrophone and providing accelerometer signals indicative of the motion of the accelerometer system, the accelerometer system including an attitude sensor providing output signals indicative of the gravitational vector;

a load cell system mounted in the streamer proximate the hydrophone and having mechanically compliant portions between first ends rigidly connected to a stress member extending axially along the streamer and second ends rigidly connected to the accelerometer system and providing vibration signals indicative of the vibration of the stress member;

a signal processor mounted in the streamer proximate the hydrophone and receiving the vibration signals from the load cell system, the accelerometer signals from the accelerometer system, and pressure signals from the proximate hydrophone and reducing the effect of vibration noise and surface-reflected acoustic signal interference on a primary acoustic signal impinging on the streamer.

\* \* \* \* \*